US010002827B2

(12) United States Patent
Ning et al.

(10) Patent No.: US 10,002,827 B2
(45) Date of Patent: Jun. 19, 2018

(54) METHOD FOR SELECTIVE RE-ROUTING OF SELECTED AREAS IN A TARGET LAYER AND IN ADJACENT INTERCONNECTING LAYERS OF AN IC DEVICE

(71) Applicant: GLOBALFOUNDRIES Inc., Grand Cayman (KY)

(72) Inventors: Guoxiang Ning, Ballston Lake, NY (US); Yuping Ren, Clifton Park, NY (US); Chin Teong Lim, Clifton Park, NY (US); Xusheng Wu, Ballston Lake, NY (US); Paul Ackmann, Gansevoort, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days. days.

(21) Appl. No.: 15/458,140

(22) Filed: Mar. 14, 2017

(65) Prior Publication Data

US 2017/0186687 A1    Jun. 29, 2017

Related U.S. Application Data

(62) Division of application No. 14/704,488, filed on May 5, 2015, now Pat. No. 9,672,313.

(51) Int. Cl.
*G06F 17/50* (2006.01)
*H01L 23/522* (2006.01)
*G03F 1/36* (2012.01)
*H01L 23/528* (2006.01)

(52) U.S. Cl.
CPC ............ *H01L 23/5226* (2013.01); *G03F 1/36* (2013.01); *G06F 17/5077* (2013.01); *G06F 17/5081* (2013.01); *H01L 23/528* (2013.01); *G06F 2217/12* (2013.01)

(58) Field of Classification Search
CPC ........ G03F 1/144; G03F 1/36; G06F 17/5081; G06F 17/5068; G06F 17/5077; G06F 2217/12; H01L 23/5226
See application file for complete search history.

(56) References Cited

U.S. PATENT DOCUMENTS

| 6,275,971 | B1 * | 8/2001 | Levy | ................... G06F 17/5081 716/136 |
| 7,930,656 | B2 * | 4/2011 | Aton | ......................... G03F 1/36 430/30 |
| 2007/0266352 | A1 | 11/2007 | Cheng et al. | |

(Continued)

*Primary Examiner* — Nha Nguyen
(74) *Attorney, Agent, or Firm* — Ditthavong & Steiner, P.C.

(57) ABSTRACT

Methods for identification and partial re-routing of selected areas (e.g., including critical areas) in a layout of an IC design and the resulting device are disclosed. Embodiments include comparing design data of an IC device against criteria of manufacturing processes to manufacture the IC device; identifying in the design data a layout area based, at least in part, on proximity of metal segments, interconnecting segments, or a combination thereof in the layout area; performing partial re-routing in the layout area to substantially meet the criteria, wherein at least one interconnecting element is shifted or extended; and integrating the partial re-routing into the design data for use in the manufacturing processes.

9 Claims, 8 Drawing Sheets

(56) References Cited

U.S. PATENT DOCUMENTS

| | | |
|---|---|---|
| 2009/0300561 A1 | 12/2009 | Tong et al. |
| 2010/0023916 A1 | 1/2010 | Chew et al. |
| 2011/0185329 A1 | 7/2011 | Wen et al. |
| 2015/0040080 A1 | 2/2015 | Hamouda et al. |
| 2015/0379188 A1 | 12/2015 | Kahng et al. |

* cited by examiner

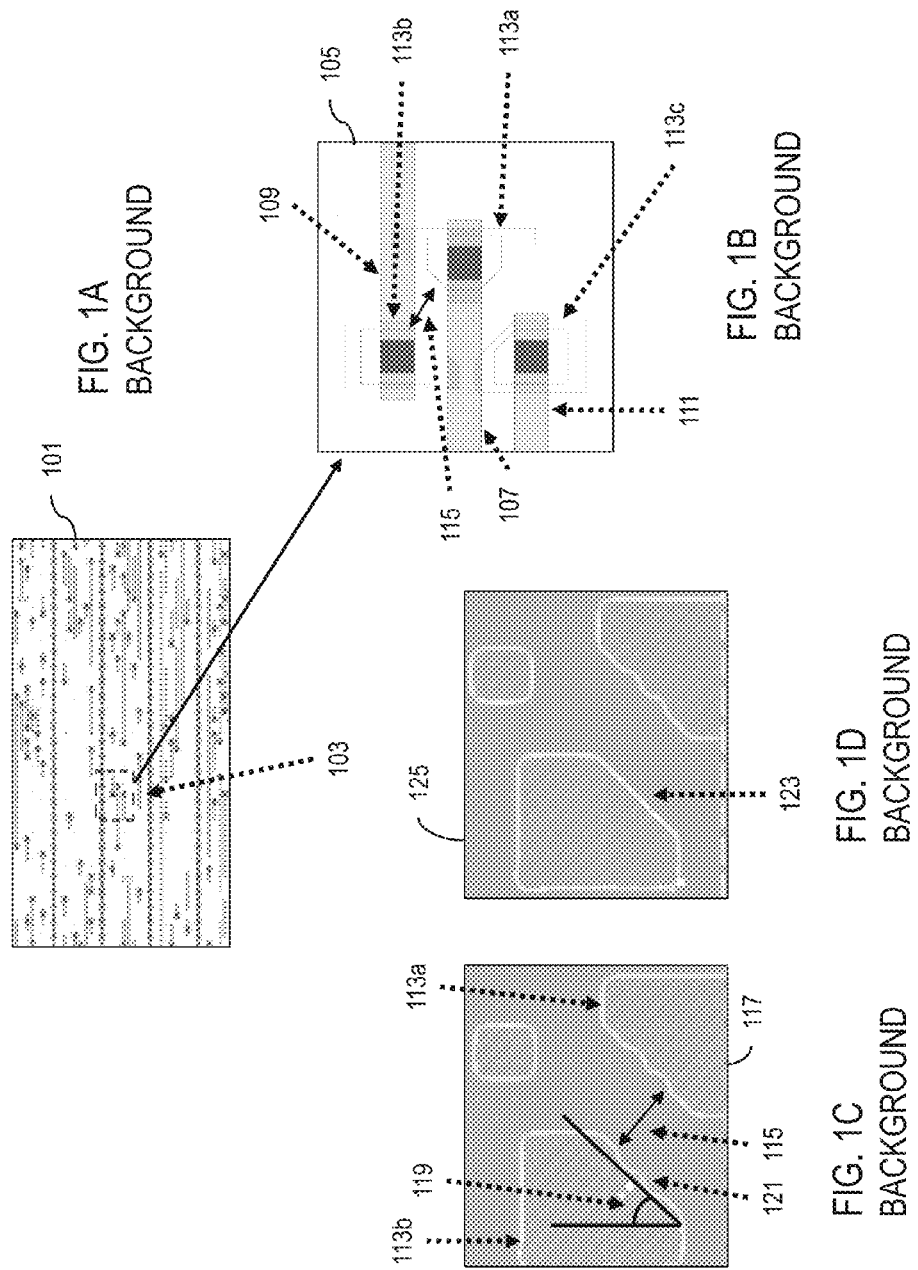

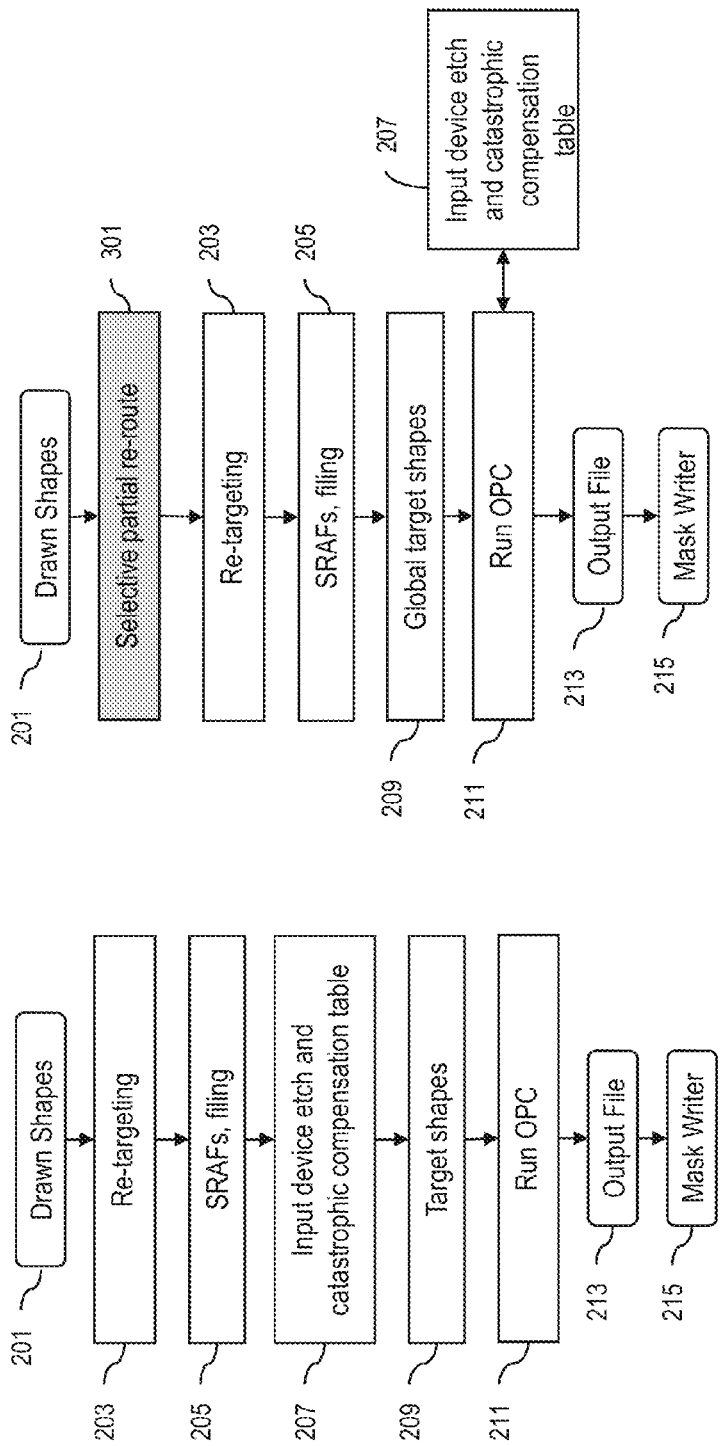

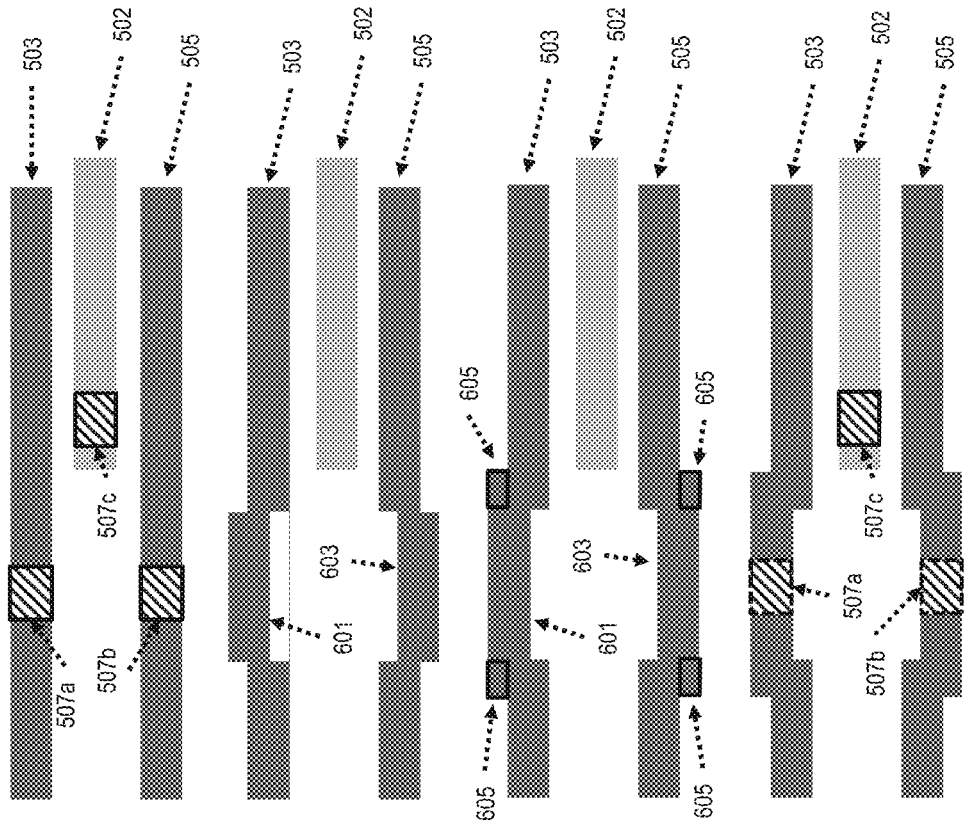

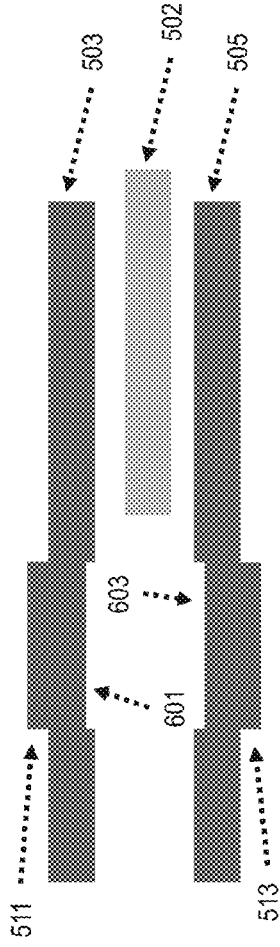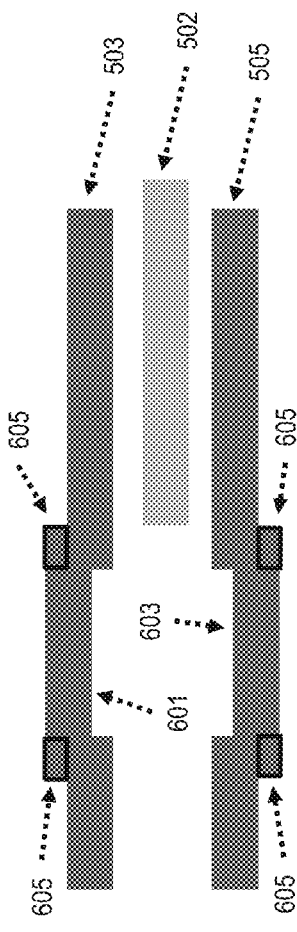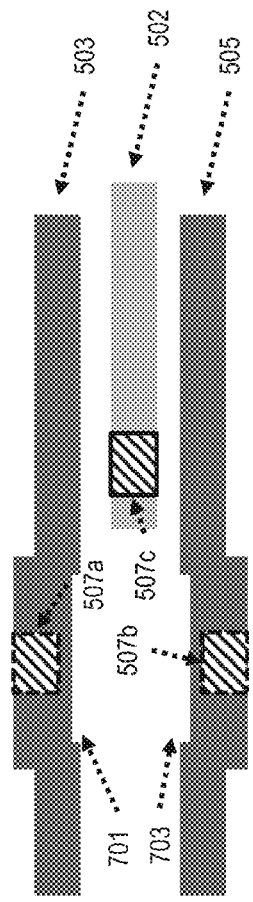

METHOD FOR SELECTIVE RE-ROUTING OF SELECTED AREAS IN A TARGET LAYER AND IN ADJACENT INTERCONNECTING LAYERS OF AN IC DEVICE

CROSS-REFERENCE TO RELATED APPLICATION

This application is a Divisional of U.S. application Ser. No. 14/704,488, filed May 5, 2015, the content of which is incorporated herein by reference in its entirety.

TECHNICAL FIELD

The present disclosure relates generally to designing and fabricating integrated circuit (IC) devices. The present disclosure is particularly applicable to optimization of layout design of an IC device based on criteria of fabrication processes utilized in fabrication of IC devices.

BACKGROUND

Generally, manufacturing/fabrication of an IC device includes processing of its design data, which includes physical layout Information of structures such as circuit (e.g., transistors) and interconnecting elements that would form the device, where the data may be provided by a client, or its IC designers, to an IC manufacturing vendor. Typically, a photolithography (lithography) process may be utilized to optically print/pattern various layers of a circuit design onto a surface of a silicon (Si) substrate for creating the various elements and circuits. In lithography, a photomask is used to mask or expose areas on the substrate that are to be, respectively, blocked from or patterned by a light beam, such as light produced by an Argon-Fluoride laser (ArF), Krypton-Fluoride laser (KrF), extreme ultraviolet (EUV), or the like source.

A photomask may be developed by use of electron beam (e-beam) lithography, which enables patterning/writing very small patterns on substrates with a high level of precision. Unfortunately, optical proximity effects, along with mask pattern fidelity and photoresist processing limitations commonly cause errors in patterning the desired pattern onto the substrate. To increase viable resolution and pattern transfer reliability, resolution enhancement techniques such as optical proximity correction (OPC) models may be utilized to optimize a photomask for substrate processing. The object of OPC is to make systematic modifications to mask geometry to compensate for systematic errors. However, complex designs and continued efforts to miniaturize the IC devices present various limitations that may negatively impact the manufacturing processes and cause less throughput, less process margin, higher costs, lower yields, or the like issues.

FIG. 1A is a layout illustration of an example IC device. IC designers utilize various electronic design automation (EDA) software tools in designing and analyzing the circuits in an IC device. Additionally, the design tools are utilized to render a layout of the IC design targeting a specific technology node (e.g., 28 nm, 20 nm, 14 nm, etc.) Moreover, an IC manufacturer, or a third party vendor, may use EDA tools to evaluate a client's IC design data, in a graphic data system file (e.g., GDSII), for determining manufacturability of the IC based on the manufacturer's production processes criteria and identifying any potential issues therein. Diagram 101 illustrates a layout of different layers in an IC device where a potential critical area 103 is highlighted and shown in greater detail as diagram 105 in FIG. 1B. As noted, e-beam lithography and OPC may be impacted by an IC design and its layout; therefore, criteria, such as minimum spacing between elements, associated with the lithography and/or OPC may be utilized to identify potential critical areas in the layout. However, potential bridging (e.g., short circuiting) issues exist with the current solution even after new OPC re-targeting. In diagram 105, a metal segment 107, such as in a second level metal layer, and two adjacent metal segments 109 and 111 are connected, respectively, to connecting vias 113a, 113b, and 113c, which are between a first level metal layer segment and a second level metal layer segment. As a short-term solution, the spacing between connecting vias may be formed at an angle of 45 degrees (45°), as shown in FIG. 1B, to increase the spacing to protect from the bridging issue of the nearby connecting vias after lithography in substrate processing. As shown in diagram 117 of FIG. 1C, one potential issue may be due to insufficient distances, such as 115, between the patterns of the connecting vias 113a, 113b, and/or 113c, where bridges may be formed causing signal interference. Another potential issue may be due to at least one border of the connecting vias 113a, 113b, and 113c being at an angle of 45°, as 119 shown in FIG. 1C, which may increase run times for the associated e-beam lithography and OPC processes. Additionally, a border rendered at a 45° angle may have a distorted edge, as 121, which may require additional e-beam writer iterations to render a smoother edge 123 as shown in diagram 125 of FIG. 1D. Although some of the stated issues may be addressed before the design of an IC is finalized (e.g., by an IC designer), it would be challenging and inefficient since the processes employed by different IC manufactures vary. Moreover, a potential bridging may be due to process variations in fabrication of the IC devices. It is noted that the above issues are not limited to any particular metal or any specific connecting via layer and may be associated with all backend interconnection layers.

A need therefore exists for a methodology enabling identification and partial re-routing of selected areas, including potential critical areas, in a layout of an IC design and the resulting device.

SUMMARY

An aspect of the present disclosure is a lithography photomask with partial re-routing of selected areas, including potential critical areas, in a layout of an IC design.

Another aspect of the present disclosure is a method for identification and partial re-routing of selected areas, including potential critical areas, in a layout of an IC design.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure some technical effects may be achieved in part by a method including comparing design data of an integrated circuit (IC) device against criteria of manufacturing processes to manufacture the IC device; identifying in the design data a layout area based, at least in part, on proximity of metal segments, interconnecting via segments, or a combination thereof in the layout area; performing partial re-routing in the layout area to substantially meet the criteria, wherein at least one interconnecting element is shifted or extended; and integrating the partial re-routing into the design data for use in the manufacturing processes.

In one aspect, the partial re-routing includes forming a staircase-like extension on a portion of each of the metal segments in the layout area. In another aspect, the partial re-routing includes a widening of a portion of each of the metal segments in the layout area.

In some aspects, the partial re-routing includes a combination of forming a staircase-like extension on a portion of each of the metal segments in the critical area and a widening of a portion of each of the metal segments in the layout.

In one aspect, the staircase-like extension includes diffusing the metal segments in a target layer and corresponding metal segments in at least one adjacent layer in the layout area; and moving portions of the metal segments in opposite horizontal or vertical directions to create a step difference along a linear edge of the metal segments and the corresponding metal segments; and moving an interconnecting element, corresponding to each of the metal segments, aligned with a linear edge of each of the moved portions of the metal segments.

In another aspect, the widening includes diffusing the metal segments in a target layer and corresponding metal segment in adjacent layers in the layout area; and adding new parallel sections along a linear edge of each of the diffused metal segments and the corresponding metal segments.

In one aspect, the criteria are associated with an optical proximity correction process. In another aspect, the criteria are associated with an electron beam writing process. In a further aspect, the criteria include a minimum distance between connection points of the metal segments in adjacent layers, adjacent connecting metal and via layers, or a combination thereof. In an additional aspect, the target layer and the adjacent layer are created by a single or multiple patterning. In one aspect, parameters for the staircase-like extension and the widening are based, at least in part, on a percentage of a size of the metal segments and the corresponding metal segments.

Another aspect of the present disclosure includes a device including a semiconductor layout that includes parallel segments of adjacent metal and via layers; and a via connected to each of the metal segments in a layout area, wherein each of the metal segments include a portion parallel to the corresponding metal segment but adjacent an edge remote from the other metal segment, and the corresponding via connects to the portion.

In an additional aspect, the portion for each of the adjacent metal segments includes a widening of the corresponding metal segment in a direction remote from the other metal segment.

In some aspects, the portion for each of the adjacent metal segments includes a staircase-like extension of the corresponding metal segment in a direction remote from the other segment.

In one aspect, the portion for each of the adjacent metal segments includes a combination of a widening of the corresponding metal segment in a direction remote from the other metal segment and a staircase-like extension of the corresponding metal segment in a direction remote from the other metal segment.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIGS. 1A through 1D illustrate an example layout of an IC device and process issues of current layouts;

FIG. 2 illustrates an example process flow for creating a photomask used in substrate manufacturing of an IC device;

FIG. 3 illustrates a process flow for creating a photomask including a step for partial re-routing of critical areas in an IC layout, in accordance with an exemplary embodiment;

FIGS. 6A through 6D illustrate a process to add an extended staircase-like feature to a segment of a structure in a critical area of a layout of an IC device, in accordance with an exemplary embodiment; and FIGS. 7A through 7C illustrate combining a widening and an addition of a staircase-like feature to a segment of a structure in a critical area of a layout of an IC device, in accordance with an exemplary embodiment.

DETAILED DESCRIPTION

Figure 4:
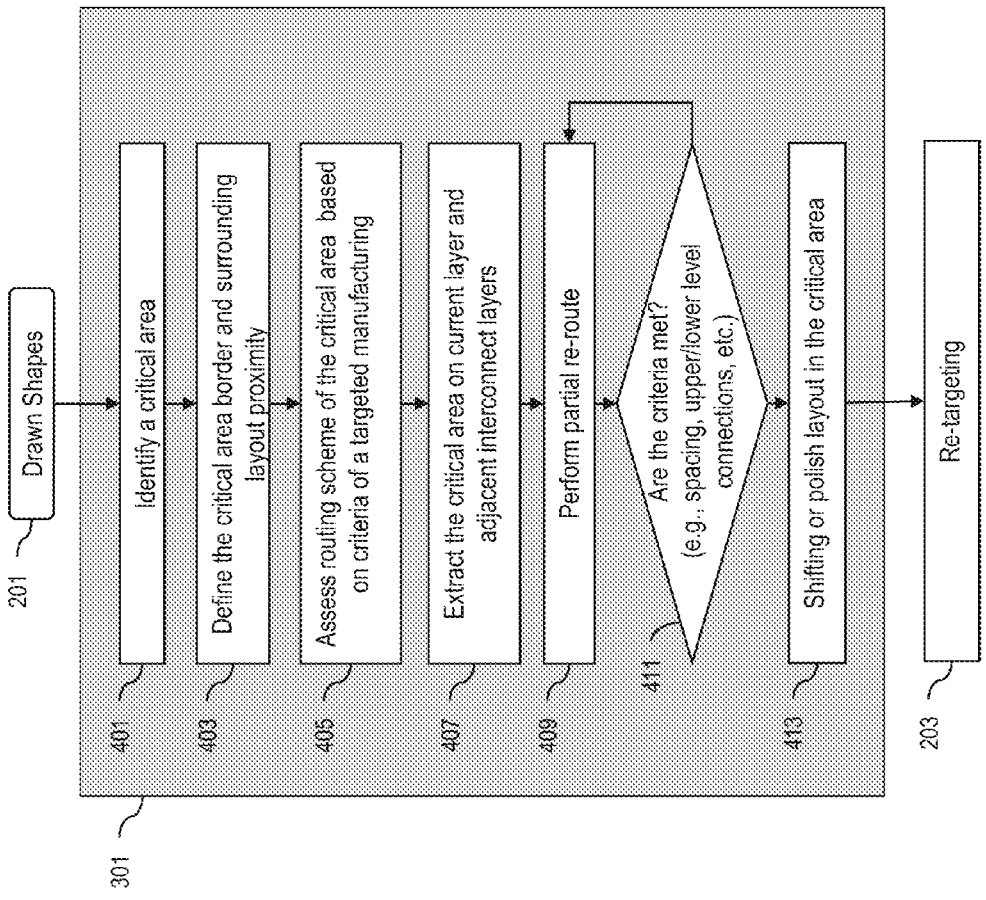
FIG. 4 illustrates a process flow for identifying and a partial re-routing of critical areas in an IC layout, in accordance with an exemplary embodiment.

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the problems of identifying and partial re-routing of complex and critical areas in a layout of an IC design. The present disclosure addresses and solves such problems, for instance, by, inter alia, analyzing design data of an IC device, identifying complex/critical areas in a target layer in the layout based on criteria of a manufacturing process that will be used to manufacture the IC device, and performing a partial re-route of the complex/critical areas in the target layer as well as pre and post interconnecting layers adjacent to the target layer so that the re-routed areas would meet or exceed the criteria.

FIG. 2 illustrates an example process flow for creating a photomask used in manufacturing of an IC device. In a typical IC fabrication process, in step 201, original design target shapes are drawn based on the circuit target by an IC design house (e.g., input GDSII files). At 203, the target shapes created during the IC design phase may be evaluated and/or modified based on the manufacturing criteria. Then at 205, sub-resolution assist features (SRAF) are optimized for maximizing the accuracy and processing window. SRAFs are non-printing shapes that are placed on the mask in proximity to OPC shapes to assist or improve the image quality during photolithography. At 207, sizing compensations are implemented to improve limits of manufacturing processes and circuit performance. At 209, the originally drawn or optimized shapes are targeted for the manufacturing process that is to be used in an OPC process. The OPC process at 211 is executed to generate an output file 213 (e.g., GDSII) for the photomask writing.

FIG. 3 illustrates a process flow for creating a photomask including a step for partial re-routing of critical areas in an IC layout, in accordance with an exemplary embodiment. The process flow in FIG. 3 is similar to that of FIG. 2, but with some differences. In an additional process step at 301, potential critical areas in the layout of an IC design may be identified and re-routed based on the manufacturing criteria. The processes of step 301 will be further discussed. Also, processes of step 207 may be performed at a different point in the process flow, for example, after the OPC process at step 211, which may be an interface (e.g., hand-shaking) between OPC run such as OPC model and recipe.

FIG. 4 illustrates a process flow for identifying and a partial re-routing of critical areas in an IC layout (step 301), in accordance with an exemplary embodiment. The process may begin at 201 with the originally drawn shapes in the layout of an IC design. At 401, one or more algorithms may evaluate the layout for identifying critical areas based on criteria of the IC manufacturing process. For example, identifying a critical area may be based on shapes, types, or spacing of structures (e.g., metal segments, connecting vias, etc.) in a given layout area when compared to criteria of the manufacturing process. At 403, borders of the shapes of the structures in the critical area as well as in surrounding layout area are defined. At 405, routing schemes of the critical areas are assessed based on criteria of a targeted manufacturing process. At 407, a critical area on a target layer and in adjacent interconnect layers are extracted. At 409, partial re-routes of the critical areas (as further illustrated and explained with respect to FIGS. 5A through 5E, 6A through 6D, and 7A through 7C) may be performed in order to meet or exceed the manufacturing criteria, for example, to achieve better manufacturing process margins. At 411, the partial re-routings are analyzed to determine if the manufacturing criteria are met; for example, with respect to criteria of spacing between adjacent interconnecting layers, maintaining connectivity to upper or lower levels, or the like. If the criteria are not met, the processes at step 409 may be repeated until the criteria are met or are within an acceptable margin, which may be defined by the manufacturer. For example, when re-routing a second or upper level metal layer segment and shifting a connecting via that connects the second or upper level metal layer segment to a first or lower level metal layer segment, the process may also analyze the layout area in adjacent layers to determine if the re-routing has caused any unintended or undesired results in the adjacent layers. Generally, upper and lower level metal layers are in perpendicular layout directions where the re-routing of the upper level metal layer and connecting via may not affect the connection of the lower level metal layer (as the re-routing may be perpendicular to the direction of the metal lines in the metal layer at issue, and therefore along the metal lines in the adjacent metal layer). At 413, the partial re-routings may replace the original routings so the overall layout may be re-targeted as in step 203. These process steps and potential solutions for the partial re-routing will be further illustrated and discussed below.

Figure 5A:
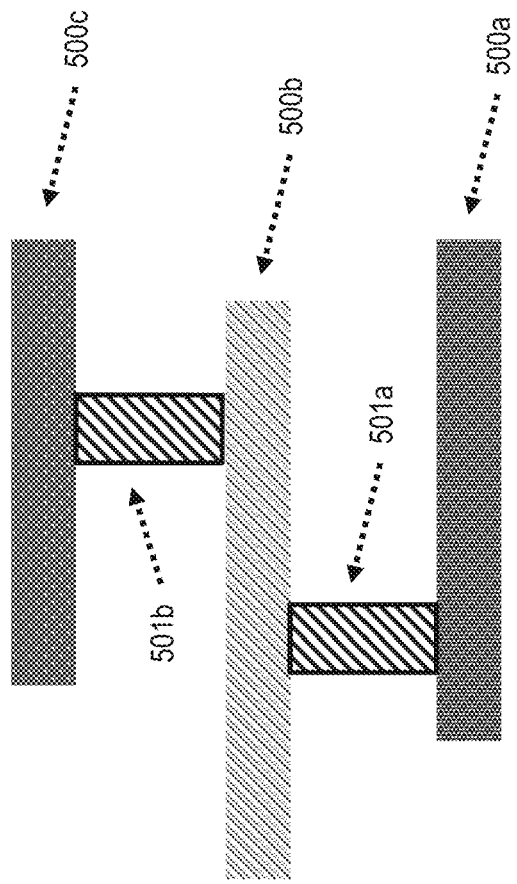
FIGS. 5A through 5E illustrate layers in an IC device and processes for widening a segment of a structure identified in a critical area of a layout of the IC device, in accordance with an exemplary embodiment.

FIGS. 5A through 5E illustrate layers in an IC device and processes for widening a segment of a structure identified in a critical area of a layout of the IC device. FIG. 5A illustrates a structure including different level metal layers in a layout of an IC device where a lower (e.g., a first) level metal layer 500a may be connected to an upper (e.g., a second) level metal layer 500b by a connecting via 501a. Also, the upper level metal layer 500b may be connected to a next upper (e.g., a third) level metal layer 500c by a connecting via 501b. However, the structure and connections therein may be applicable to other level metal layers and connecting vias.

Figure 5B:
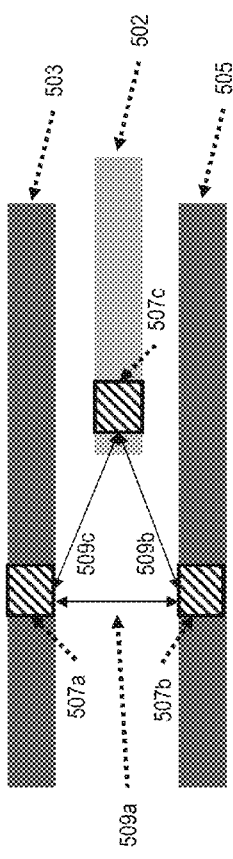
Figure 5C:
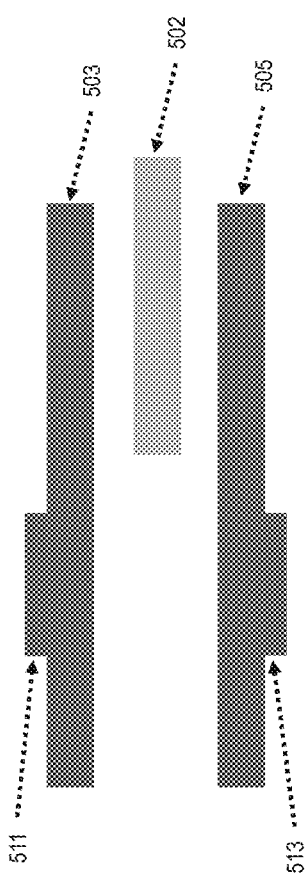
Figure 5D:
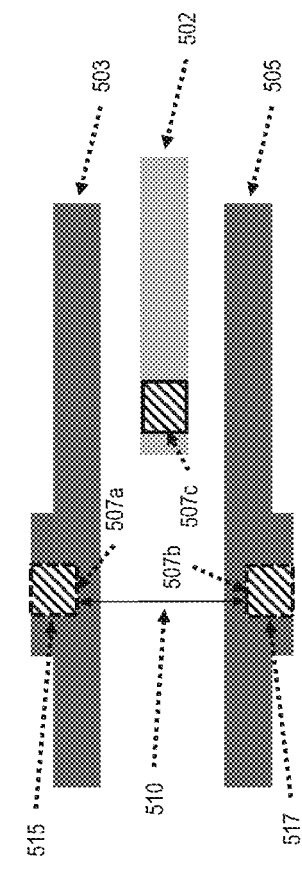
Figure 5E:
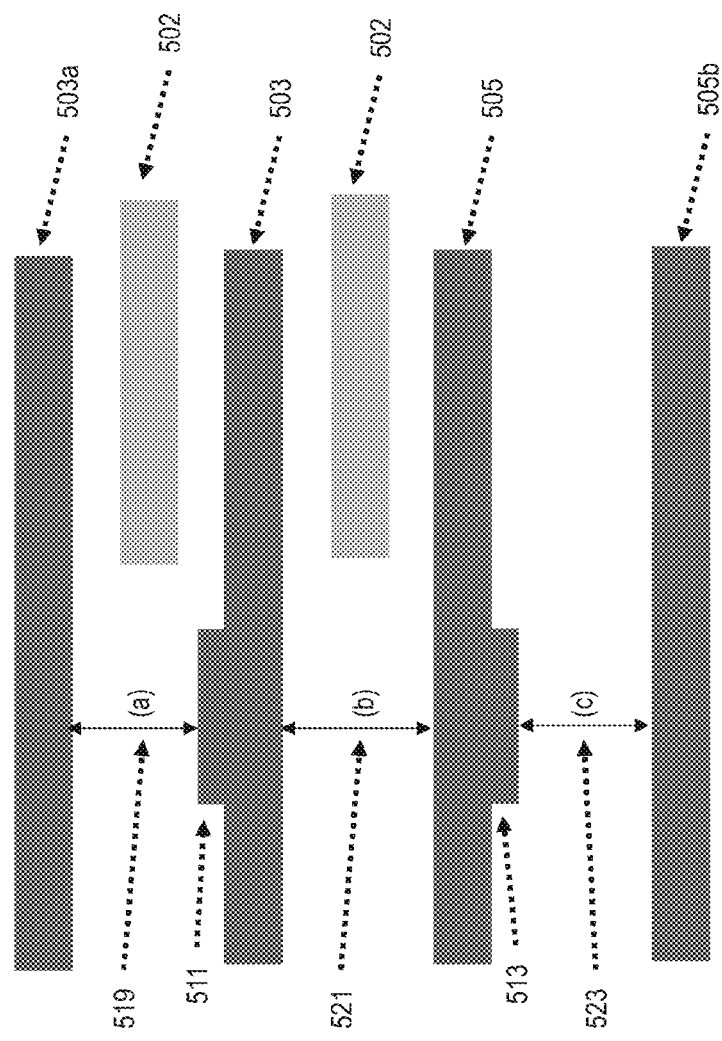

FIG. 5B illustrates an upper level metal segment 502 and adjacent segments 503 and 505, wherein the segments may be generated by different patterning photomask exposures (e.g., multiple patterning). The segments 502, 503, and 505 may have connectivity to connecting vias 507a, 507b, and 507c that may be connected to the upper and lower level metal layers. In one scenario, e.g., at step 401 of FIG. 4, the algorithm may analyze distances 509a, 509b, and 509c in between the via connections of the upper level metal segments 502, 503 and 505, wherein if any of the distances does not meet (e.g., is less than) the manufacturing criteria, then that layout area may be selected and identified as a critical area in the IC design layout. FIG. 5C illustrates the process to widen portions 511 and 513 of, respectively, the upper level metal segments 503 and 505 along parallel edges of the portions where there are connections to the connecting vias 507a and 507b. The process may also include analyzing adjacent layer areas that are close to the widened portions 511 and 513 to determine if there are any adverse effects, such as insufficient spacing, to the adjacent layers. FIG. 5D illustrates shifting of the connecting vias 507a and 507b into new positions 515 and 517 in the widened portions of the upper level metal segments 503 and 505, where distance 510 is greater than the original distance 509a; for example, to meet the manufacturing criteria. In FIG. 5E, an algorithm may re-evaluate the layout to determine if the partially re-routed structures in the critical areas now meet the manufacturing criteria; for example, distance 519 (a) between a widened portion 511 of upper level metal segments 503 and 503a, or distance 521 (b) between upper level metal segments 503 and 505, or distance 523 (c) between a widened portion 513 of upper level metal segments 505 and 505b. Also, the spacing between shifted segments and adjacent interconnecting layers (e.g., lower metal level and connecting via between upper level metal and a further upper level metal segment) are evaluated or re-evaluated for any unintended results such as a disconnection (e.g., open) between a via and an adjacent (e.g., upper or lower) level metal layer. However, this process is not limited to lower or upper level metal layers or to the connecting vias between them. It may be applied to all level metal and connecting via layers.

FIGS. 6A through 6D illustrate a process to add an extended staircase-like feature to a segment of a structure in a critical area of a layout of an IC device. FIG. 6A illustrates the upper level metal segments 502, 503, and 505, wherein each segment has connection to the connecting vias 507a, 507b, and 507c. In FIG. 6B, portions 601 and 603 of, respectively, the upper level metal segments 503 and 505 are moved in opposite directions to create a staircase-like feature along parallel edges of the segments 503 and 505. Next, in FIG. 6C, portions 605 are added to each side of the portions 601 and 603 to extend the staircase-like feature. After evaluating the partial re-route, it may be shifted into the original layout where the connecting vias 507*a*, 507*b*, and 507*c* may be re-established onto the extended staircase-like portions as shown in FIG. 6D. Additionally, the spacing between shifted segments and adjacent interconnect layers (e.g., lower lever metal segment and connecting via between upper level metal and further upper level metal segment) may be evaluated or re-evaluated to identify any potential negative impacts to the adjacent layers.

FIGS. 7A through 7C illustrate combining a widening and an addition of a staircase-like feature to a segment of a structure in a critical area of a layout of an IC device. FIG. 7A illustrates a combining of the processes discussed in relation to FIGS. 5A through 5E and 6A through 6D. In FIG. 7A, the portions 511 and 513 may be added to the staircase-like features of 601 and 603, respectively. Additionally, in FIG. 7B, the portions 511 and 513 may be extended by addition of portions 605 to meet the spacing criteria, wherein concave areas 701 and 703 in FIG. 7C may be narrower than the areas in FIG. 7B. Moreover, the spacing between shifted segments and adjacent connecting layers (e.g., lower level metal layer and connecting via between upper level metal layer and the next upper level metal layer) are evaluated or re-evaluated for meeting the manufacturing criteria.

It should be noted that although in each of the examples the modification (i.e., the widening and/or addition of a staircase-like feature) is employed symmetrically on segments 503 and 505, the modifications do not need to be symmetrical. For example, one segment may be widened, whereas the other may not be modified at all. Alternatively, one segment may be widened while the other may include the staircase-like addition or both types of modifications. Also, the widening may be larger on one segment than on the other segment. Further, all of the examples show a critical area including three segments 502, 503, and 505 with three vias, but a critical area is not limited to three segments and three vias.

The embodiments of the present disclosure can achieve several technical effects, including improved fabrication and mask-house patterning process as well as e-beam lithography processes utilized in creating photomasks used in manufacturing of IC devices. Further, the embodiments enjoy utility in various industrial applications as, for example, microprocessors, smart phones, mobile phones, cellular handsets, set-top boxes, DVD recorders and players, automotive navigation, printers and peripherals, networking and telecom equipment, gaming systems, digital cameras, or other devices utilizing logic or high-voltage technology nodes. The present disclosure therefore enjoys industrial applicability in any of various types of highly integrated semiconductor devices, including devices that use SRAM memory cells (e.g., liquid crystal display (LCD) drivers, synchronous random access memories (SRAM), digital processors, etc.), particularly for 7 nm technology node devices and beyond.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A device comprising:
a semiconductor layout comprising:
parallel segments of adjacent metal and via layers; and
a via connected to each of the metal segments in a layout area,
wherein first and second level metal segments include a portion parallel to the corresponding metal segment but adjacent an edge remote from the other metal segment, and the corresponding via connects to the portion,
wherein the portion for the first level metal segment on a first side of the first level metal segment comprises a widening of the first metal segment, and a recessing on a second side of the first level metal segment, and
wherein the portion for the second level metal segment on a first side of the second level metal segment comprises a recessing of the second metal segment, and a widening on a second side of the second level metal segment.

2. The device according to claim 1, wherein the portion for each of the adjacent metal segments comprises a staircase-like extension of the corresponding metal segment in a direction remote from the other metal segment.

3. The device according to claim 1, wherein the portion for each of the adjacent metal segments comprises a combination of a widening of the corresponding metal segment in a direction remote from the other metal segment and a staircase-like extension of the corresponding metal segment in a direction remote from the other metal segment.

4. The device according to claim 1, wherein the staircase-like extension comprises:
diffused metal segments in a target layer and in at least one adjacent layer in the layout area;
wherein portions of the metal segments are in opposite vertical directions to create a step difference along a linear edge of the metal segments and the corresponding metal segments.

5. The device according to claim 4, wherein the staircase-like extension further comprises:
an interconnecting element, corresponding to each of the metal segments, aligned with a linear edge of each of the portions of the metal segments.

6. A device comprising:
a semiconductor layout comprising:
parallel segments of adjacent metal and via layers; and
a via connected to each of the metal segments in a layout area, wherein first and second level metal segments include a portion parallel to the corresponding metal segment but adjacent an edge remote from the other metal segment, and the corresponding via connects to the portion,
wherein the portion for the first level metal segment on a first side of the first level metal segment comprises a widening of the first metal segment, and a recessing on a second side of the first level metal segment, and
wherein the portion for the second level metal segment on a first side of the second level metal segment comprises a recessing of the second metal segment, and a widening on a second side of the second level metal segment.

7. The device according to claim 6, wherein the widening comprises:
diffused metal segments in a target layer and corresponding metal segment in an adjacent layer in the layout area; and
new parallel sections along a linear edge of each of the diffused metal segments and the corresponding metal segments.

8. The device according to claim 6, further comprising:
a staircase-like extension on a portion of each of the metal segments in the layout area.

9. The device according to claim 8, wherein the staircase-like extension comprises:
diffused metal segments in a target layer and corresponding metal segments in at least one adjacent layer in the layout area;
portions of the metal segments in opposite directions to create a step difference along a linear edge of the metal segments and the corresponding metal segments; and
an interconnecting element, corresponding to each of the metal segments, aligned with a linear edge of each of the moved portions of the metal segments.

* * * * *